United States Patent
Pina-Hernandez et al.

(10) Patent No.: US 12,552,935 B2
(45) Date of Patent: Feb. 17, 2026

(54) POLYDISULFIDE POLYMER

(71) Applicant: aBeam Technology, Inc., Hayward, CA (US)

(72) Inventors: Carlos Pina-Hernandez, Berkeley, CA (US); Keiko Munechika, Oakland, CA (US)

(73) Assignee: HighRI Optics, Inc., Oakland, CA (US)

( * ) Notice: Subject to any disclaimer, the term of this patent is extended or adjusted under 35 U.S.C. 154(b) by 0 days.

(21) Appl. No.: 18/381,897

(22) Filed: Oct. 19, 2023

(65) Prior Publication Data

US 2024/0228780 A1    Jul. 11, 2024

Related U.S. Application Data

(63) Continuation of application No. 15/982,078, filed on May 17, 2018, now abandoned.

(60) Provisional application No. 62/509,535, filed on May 22, 2017.

(51) Int. Cl.
| | |
|---|---|
| *C08L 81/02* | (2006.01) |
| *C08G 75/02* | (2016.01) |
| *C08G 75/0281* | (2016.01) |
| *C08G 75/14* | (2006.01) |
| *C08K 3/22* | (2006.01) |
| *C08L 81/04* | (2006.01) |
| *G02B 1/04* | (2006.01) |

(52) U.S. Cl.
CPC .......... *C08L 81/02* (2013.01); *C08G 75/0272* (2013.01); *C08G 75/0281* (2013.01); *C08G 75/14* (2013.01); *C08K 3/22* (2013.01); *C08L 81/04* (2013.01); *C08K 2201/005* (2013.01); *C08L 2201/10* (2013.01); *G02B 1/041* (2013.01); *G02B 1/045* (2013.01)

(58) Field of Classification Search
CPC ...... C08L 81/02; C08L 81/04; C08L 2201/10; C08L 2201/05; C08G 18/28; C08G 75/04; C08K 3/22; G02B 1/041
See application file for complete search history.

(56) References Cited

U.S. PATENT DOCUMENTS 6,313,251 B1 * 11/2001 Toh .................... G02B 1/04
                                                    526/321
2016/0289395 A1 * 10/2016 Stiegman ............... C08G 75/00

* cited by examiner

*Primary Examiner* — Shane Fang
(74) *Attorney, Agent, or Firm* — Fernando & Partners, LLP

(57) ABSTRACT

A method for forming a polydisulfide polymer is described. In various implementations, the method includes forming a mixture including one or more thiols, agitating the mixture, precipitating the mixture, and extracting a polydisulfide polymer from the mixture. In various implementations, the polydisulfide polymer has a refractive index of at least 1.7.

12 Claims, 4 Drawing Sheets

POLYDISULFIDE POLYMER

CROSS-REFERENCE TO RELATED APPLICATIONS

This application is a continuation of U.S. patent application Ser. No. 15/982,078, filed on May 17, 2018, which claims priority to U.S. Provisional Patent App. No. 62/509,535, filed May 22, 2017, which are both hereby incorporated by reference their entirety.

TECHNICAL FIELD

The present disclosure relates generally to polymers, and, in particular, to polydisulfide polymers with high refractive index and high optical transparency.

BACKGROUND

The development of materials having a high refractive index and high optical transparency has attracted large interest in recent years due to their applications for advanced optical devices including light emitting diodes, waveguides, optical lenses, filters and optical fibers.

BRIEF DESCRIPTIONS OF THE DRAWINGS

For a better understanding of aspects of the various implementations described herein and to show more clearly how they may be carried into effect, reference is made, by way of example only, to the accompanying drawings.

Figure 1A:
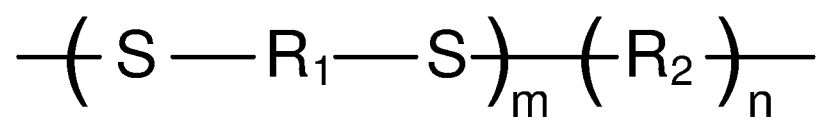
FIG. 1A is a general formula for a polydisulfide polymer in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

In various implementations, high refractive index materials can be created using 1) hybrid organic-inorganic materials, 2) nanocomposites consisting of inorganic nanoparticles dispersed in a polymeric matrix, and 3) purely organic polymers. One example of a high refractive index material is described in U.S. Pat. No. 9,298,089, filed on Jul. 24, 2014, and hereby incorporated by reference in its entirety.

In various implementations, hybrid organic-inorganic materials with a refractive index as high as 2.1 can be generated. Such materials can be used in fabrication of photonic devices including waveguides, demultiplexers, etc. In various implementations, this class of materials is subjected to high-temperature post-processing (typically above 400° C.), which may be incompatible with some materials and processes. Further, in various implementations, the thickness of films formed of this type of materials is generally small (e.g., on the scale of a few hundreds of nanometers), with thicker films prone to cracking.

In various implementations, nanocomposites comprising polymers and inorganic nanoparticles can be generated and used in various applications due to their capabilities for achieving refractive indexes larger than 1.80. However, in various implementations, such materials have short shelf lives and can be prone to nanoparticle aggregation which produces scattering and reduces the optical transparency of the material.

In various implementations, organic polymers can be used in many applications due to their characteristics including being lightweight, impact resistant, and processable. In various implementations, they can exhibit many advantages over inorganic materials, such as higher transparency, suitable for thick films (from 1 µm to the orders of centimeters), low shrinkage, mild processing conditions, and longer shelf lives. The refractive index of a wide variety of organic polymers lays between approximately 1.40 and 1.70. Polymers with higher refractive index values are considered as having a "high refractive index" and can find applications where compact and lighter devices are required, such as lenses, prisms, and waveguides. Materials having a high refractive index can be used in applications such as optical adhesives, encapsulants for antireflective coatings, and microlenses for complementary metal oxide semiconductor (CMOS) image sensors.

In various implementations, the refractive index of polymers can be increased when chemical groups having high molar refraction and low molar volume are tailored within the polymer structures. For instance, in some embodiments, the introduction of halogen atoms (excluding fluorine), aromatic rings, and sulfur increases the refractive index of a polymer. However, in some circumstances, aromatic and sulfur atoms can also have unwanted side effects, such as reducing the optical transparency in the visible range.

In various implementations, high refractive index thermosets containing episulfides, polythiols, and polyisocyanates can be processed via cast molding to produce transparent polymeric compositions with a refractive index of 1.74 and used in such applications as eyeglasses and optical lenses. However, in various implementations, these polymerizable compositions contain iso(thio)cyanate compounds, which are extremely hazardous. In various implementations, a thermoplastic polymer (materials processed via injection molding) including poly (phenylene sulfides) and hyperbranched polyvinylsulfides can have an index of refractions as high as 1.80. Although such materials are relatively transparent, their synthesis is expensive and their solubility in common solvents is low, hampering its processability.

Inexpensive and optically transparent polymers with high refractive index that are easily processed are strongly desired in many industries for the fabrication of advanced and more complex optical elements.

Polydisulfides are polymers with disulfide repeats in their main chain that find applications in many areas including biochemistry (e.g., to create functional supramolecular systems), adhesives, and rubber industries. Disclosed herein is a class of random polydisulfide polymers with a refractive index ranging from approximately 1.70 to 1.85 with high transparency for optical applications.

Figure 1B:
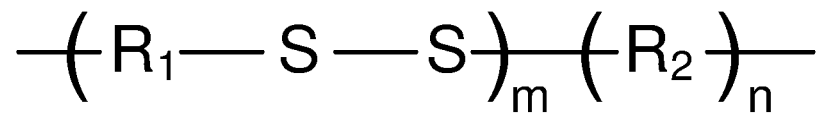
FIG. 1B is another general formula for a polydisulfide polymer in accordance with some implementations.

FIG. 1A is a general formula for a polydisulfide polymer in accordance with some implementations. FIG. 1B is another general formula for a polydisulfide polymer in accordance with some implementations. In various implementations, the polydisulfide polymer is formed via the reaction between thiol monomers and/or between thiol and ene monomers. In various implementations, the polydisulfide polymer contains functional groups for further reactions, such as crosslinking.

In FIGS. 1A and 1B, m is an integer of at least 1; $R_1$ is an aliphatic, alicyclic, heterocyclic, or aromatic organic residue; n is an integer of at least 0; and $R_2$ is a metallic, aliphatic, alicyclic, heterocyclic, or aromatic organic compound.

In various implementations, m is at least 2. In various implementations, m is at least 3. In various implementations, m is at least 4. In various implementations, m is at least 5. In various implementations, n is at least 1. In various implementations, n is at least 2.

Figure 2:
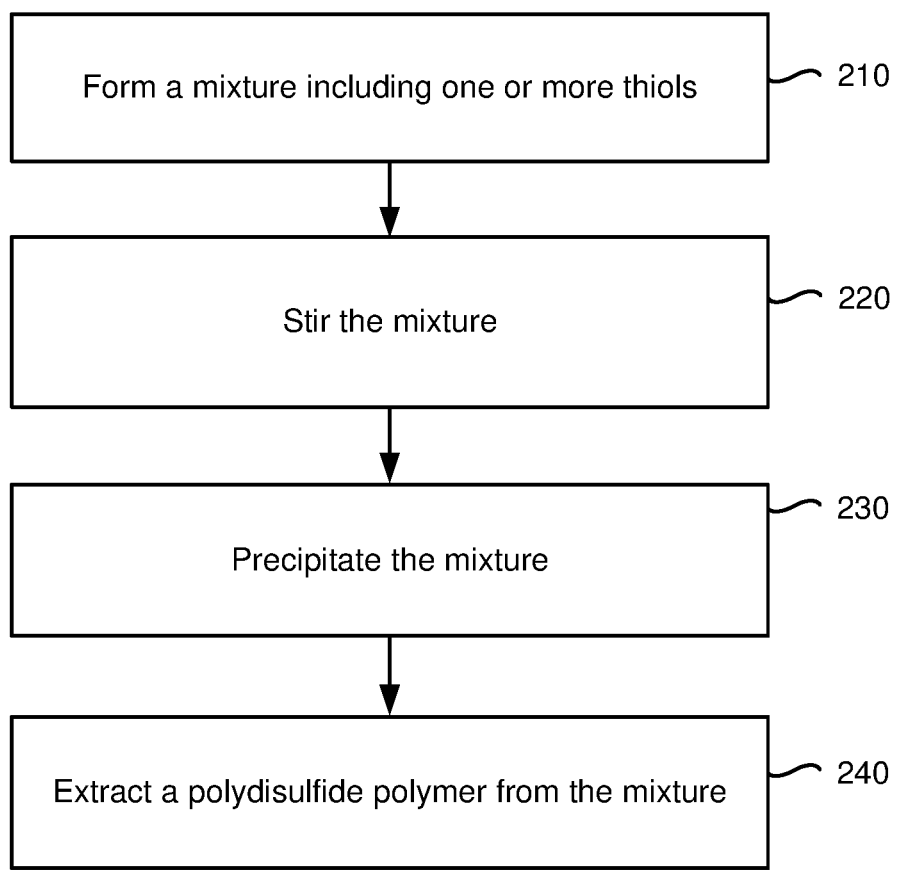
FIG. 2 is a flowchart representation of a method of forming a polydisulfide polymer in accordance with some implementations.

FIG. 2 is a flowchart representation of a method 200 of forming a polydisulfide polymer in accordance with some implementations. As noted above, the polydisulfide polymer can be formed via the reaction between thiol monomers and/or between thiol and ene monomers (thereby yielding a polydisulfide copolymer).

The method 200 begins, in block 210, with the forming of a mixture including one or more thiols. In various implementations, the mixture includes one thiol. In various implementations, the mixture includes two different thiols. In various implementations, the mixture includes three different thiols. Example of thiols used for the polymer synthesis include, but are not limited to, monothiol, dithiol, trithiol, tetrathiol and polythiols such as: methanethiol, ethanethiol, propanethiol, 1-butanethiol, 2-butanethiol, 1-pentanenethiol, 1-hexanethiol, 1-heptanethiol, 1-octanethiol, 1-nonanethiol, 1-decanethiol, thiophenol, methanedithiol, 1,1-propanedithiol, 1,2-propanedithiol, 1,3-propanedithiol, 1,4-butanedithiol, 1,5-pentanedithiol, 1,6-hexanedithiol, benzene-1,2-dithiol, benzene-1,3-dithiol, benzene-1,4-dithiol, 4,4'-thiobisbenzenethiol, 1,2-pentanedithiol, ethanedithiol, pentaerythritol tetrakis(3-mercaptopropionate), biphenyl-4,4'-dithiol, 1,4-bis(4-mercaptophenyl)benzene, 1,3,4-thiadiazole-2,5-dithiol, (1,2,4) thiadiazole-3,5-dithiol, poly (ethylene glycol) dithiol, 1,3,5-trimercaptobenzene, pentaerythritol tetra(2-mercaptoacetate), 4-mercaptomethy-1,8-dimercapt-3,6-dithiaoctane, 5,7-dimercaptomethyl-1,11-dimercapto-3,6-trithiaundecane, bis(mercaptoethyl)sulfide, 2,5-bis(mercaptomethyl)-1,4-dithiane, tetra(ethylene glycol) dithiol, 2,2'-(ethylenedioxy)diethanethiol, 1,1',4',1''-terphenyl-4-thiol, 2-thiazoline-2-thiol, 5-bromopyridine-2-thiol, biphenyl-4-thiol, 1,3,5-benzenetrithiol, 1,7-naphthalenedithio, 1,5-naphtalenedithiol.

In various implementations, the mixture includes one or more ene monomers. In various implementations, the mixture includes one ene monomer. In various implementations, the mixture includes two different ene monomers. In various implementations, the mixture includes three different ene monomers. Example of ene monomers used for the polymer synthesis include, but are not limited to, mono or multifunctional vinyl, vinylether, acrylate, methacrylate, and allyls such as: bisphenol A ethoxylate diacrylate, bisphenol A ethoxylate dimethacrylate, bisphenol A dimethacrylate, ethylene glycol diacrylate, ethylene glycol diacrylate, pentaerythritol tetraacrylate, trimethylolpropane ethoxylate triacrylate, glycerol propoxylate triacrylate, tetravinyl tin, tetravinyl silane, divinyl dimethyl silane, diallyl dimethyl silane, divinylbenzene, 1,3,5-trivinylbenzene, 1,3,5-trivinyl-1,3,5-trimethylcyclotrisiloxane, 1,3,5-trivinyl-1,3,5-trimethylcyclotrisilazane, 1,2,3-trivinycyclohexane, divinylsulfone, 3,9-divinyl-2,4,8,10-tetraoxaspiro[5.5]undecane, 1,4-butanediol divinyl ether, tri(ethylene glycol) divinyl ether, di(ethylene glycol) divinyl ether, poly(ethylene glycol) divinyl ether, 1,4-pentadien-3-ol, vinyl acrylate, 1,4-divinyl-1,1,2,2,3,3,4,4-octamethyltetrasilane, acrylate, methacrylate, ethyl-2-propylacrylate, butyl methacrylate, butyl acrylate, tert-butyl acrylate, butyl methacrylate, tert-butyl methacrylate, propyl methacrylate, N-propyl methacrylate, 3-(trimethoxysilyl)propyl methacrylate, acrylic acid, methacrylic acid, 3-butenoic acid, 4-pentenoic acid, 2-methyl-4-pentenoic acid, 2-pentenoic acid.

In various implementations, the mixture includes a catalyst. However, in various implementations, the mixture does not include a catalyst. In various implementations, the catalyst is an amine, such as methylamine, dimethylamine, trimethylamine, ethylamine, diethylamine, triethylamine, aniline, 4-methoxyaniline, N,N-dimethylaniline, 3-nitroaniline, 4-nitroaniline, or 4-trifluoromethylaniline.

In various implementations, when the mixture includes one or more ene monomers, the catalyst speeds up the reaction joining the thiol monomers to each other faster than it speeds up the reaction joining the thiol monomers to the ene monomers. Accordingly, in various implementations, the mixture is non-stoichiometric. Thus, in various implementations, the polydisulfide polymer (e.g., a polydisulfide copolymer) is non-stoichiometric.

In various implementations, the mixture is formed in one or more solvents. In various implementations, the one or more solvents includes only one solvent. In various implementations, the one or more solvents include a mixture of different solvents. In various implementations, the one or more solvents include allicin, (R)-cysteine, methionine, diphenyl disulfide, dibenzothiophene, dimethyl sulfoxide, or dimethyl sulfone, toluene, dimethylformamide, chlorobenzene, dichlorobenzene, hexane, tetrahydrofuran, N-methyl-2-pyrrolidone, 1,3-dimethyl-3,4,5,6-tetrahydro-2(1H)-pyrimidinone, cyclopentanone, cyclohexanone, benzene, chloromethane, dichloromethane, pyridine.

The method 200 continues, in block 220, with agitation (e.g., stirring) of the mixture. In various implementations, the mixture is agitated at temperatures ranging from approximately 0° C. to 200° C. For example, in various implementations, the mixture is agitated at room temperature. In various implementations, the mixture is agitated for approximately 0.5 hours, 1 hour, 1.5 hours, 2 hours, 3 hours, 4 hours, or 12 hours.

The method 200 continues, in block 230, with precipitation of the mixture (yielding the polydisulfide polymer). In various implementations, the mixture is precipitated in a polar solvent, such as acetone, methanol, ethanol, propan-2-ol, butan-1-ol, pentan-1-ol, or hexadecan-1-ol.

The method 200 continues, in block 240, with extraction of the polydisulfide polymer from the precipitated mixture (e.g., the residual solvent). In various implementations, the precipitate (e.g., the polydisulfide polymer) is removed and exposed to air to remove additional residual solvent. In various implementations, the residual solvent is removed with heat by using a hot plate, a regular oven, or a vacuum oven. In various implementations, the residual solvent is removed with a rotary evaporator. In various implementations, the residual solvent is removed with a separation funnel. In various implementations, the residual solvent is removed by decantation. In various implementations, the residual solvent is removed by centrifugation followed by decantation.

In various implementations, the resulting polydisulfide polymer can have one or more of the following attributes: high refractive index (e.g., greater than 1.7 or greater than 1.8), high optical transparency (e.g., at least 0.9 per µm), low cost, easy synthesis, high solubility in organic solvents, and high processability.

Figure 3:
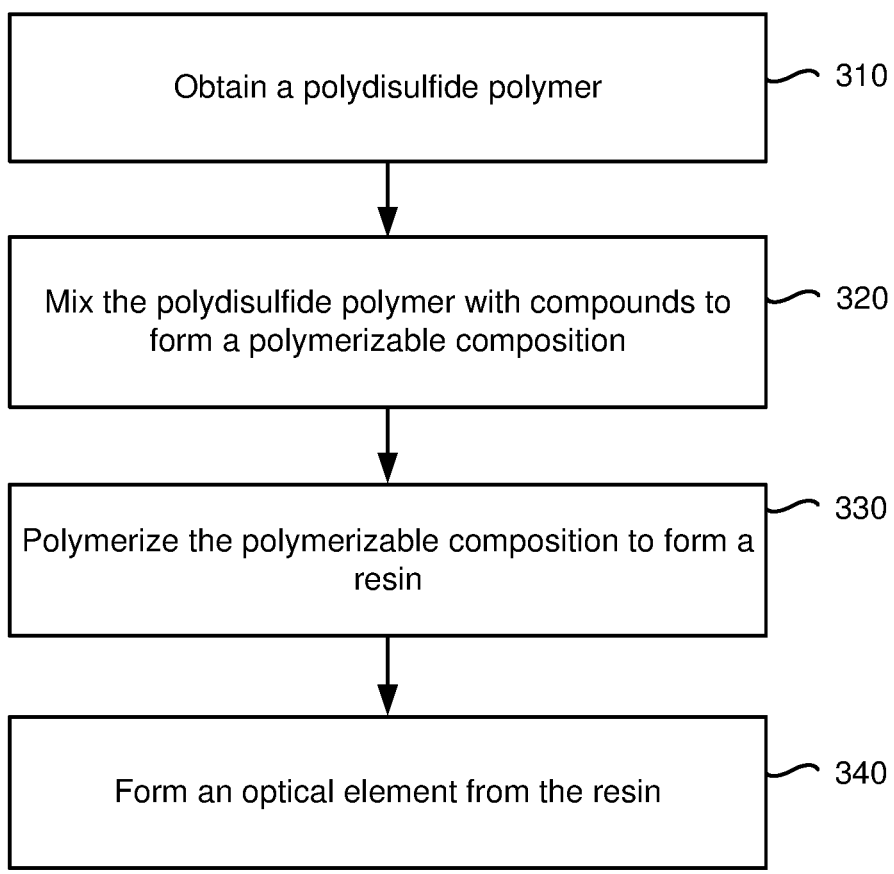
FIG. 3 is a flowchart representation of a method of forming a high refractive index optical element in accordance with some implementations.

FIG. 3 is a flowchart representation of a method 300 of forming a high refractive index optical element in accordance with some implementations. The method 300 begins, at block 310, with obtaining a polydisulfide polymer. In various implementations, the polydisulfide polymer is obtained as described above with respect to FIG. 2.

The method 300 continues, at block 320, with mixing the polydisulfide polymer with chemically compatible compounds such as thiol and/or ene compounds to form a polymerizable composition. Examples of thiol and ene compounds in the polymerizable composition are the same as listed above. In various implementations the polymerizable composition can include one or more additives such as reaction initiators, accelerants, surfactants, stabilizers, colorants. In various implementations, the polymerizable composition can be dissolved in one or more solvents to form a solution. In various implementations, the one or more solvents can include allicin, (R)-cysteine, methionine, diphenyl disulfide, dibenzothiophene, dimethyl sulfoxide, or dimethyl sulfone, toluene, dimethylformamide, chlorobenzene, dichlorobenzene, hexane, tetrahydrofuran, N-methyl-2-pyrrolidone, 1,3-dimethyl-3,4,5,6-tetrahydro-2(1H)-pyrimidinone, cyclopentanone, cyclohexanone, benzene, chloromethane, dichloromethane, pyridine, propylene glycol methyl ether acetate (PGMEA).

The method 300 continues, at block 330, with polymerizing the polymerizable composition to form a resin. In various implementations, the polymerizable composition can be polymerized at room temperature. In various implementations, the polymerizable composition can be polymerized with a high temperature, e.g. from approximately 50° C. to 250° C. In various implementations, the polymerizable composition can be polymerized with ultraviolet light.

In various implementations, metal oxide nanoparticles can be added to the polymerizable composition (e.g., between blocks 320 and 330) to increase the refractive index of the resin. In various implementations, the metal oxide is selected among metals from the Groups 2B and 4B of the periodic table.

In various implementations, the resin has the same or a different refractive index than the polymer or the polymerizable composition. In particular, in various implementations, the resin has a higher refractive index than the polymer or the polymerizable composition or a lower refractive index than the polymer or the polymerizable composition.

The method 300 continues, at block 340, with the forming of an optical element from the resin. In various implementations, the optical element includes a light emitting diode, a lens, a prism, a waveguide, an optical fiber, or an optical filter. In various implementations, the optical element (or at least the resin portion thereof) has a high refractive index. For example, in various implementations, the optical element has a refractive index greater than approximately 1.6. As another example, in various implementations, the optical element has a refractive index greater than approximately 1.7. As another example, in various implementations, the optical element has a refractive index greater than approximately 1.8. In various implementations, the optical element (or at least the resin portion thereof) is highly transparent. For example, in various implementations, the optical element has an optical transparency of at least 0.9 per µm. In various implementations, the optical element (or at least the resin portion thereof) is thick. For example, in various implementations, the optical element has a thickness of at least 1.0 nm. As another example, in various implementations, the optical element has a thickness of at least 20 nm. As another example, in various implementations, the optical element has a thickness of at least 1.0 µm. As another example, in various implementations, the optical element has a thickness of at least 1.0 cm.

In various implementations, the polymer, the polymerizable composition, or the resin can be applied on corresponding substrates to create films by different coating techniques such as spin coating, drop casting, spray coating, blade coating, or Langmuir-Blodgett deposition. In various implementations, the polymer, the polymerizable composition, or the resin can be processed with different techniques including, but not limited to, nanoimprint lithography, photolithography, two-photon lithography, ebeam lithography, injection molding, cast molding, etc. In various implementations, the polymer, the polymerizable composition, or the resin is subjected to a thermal treatment or to exposure to UV light. Such application can, in various implementations, cure the resin to form an optical element (e.g., as in block 340).

Figure 4A:
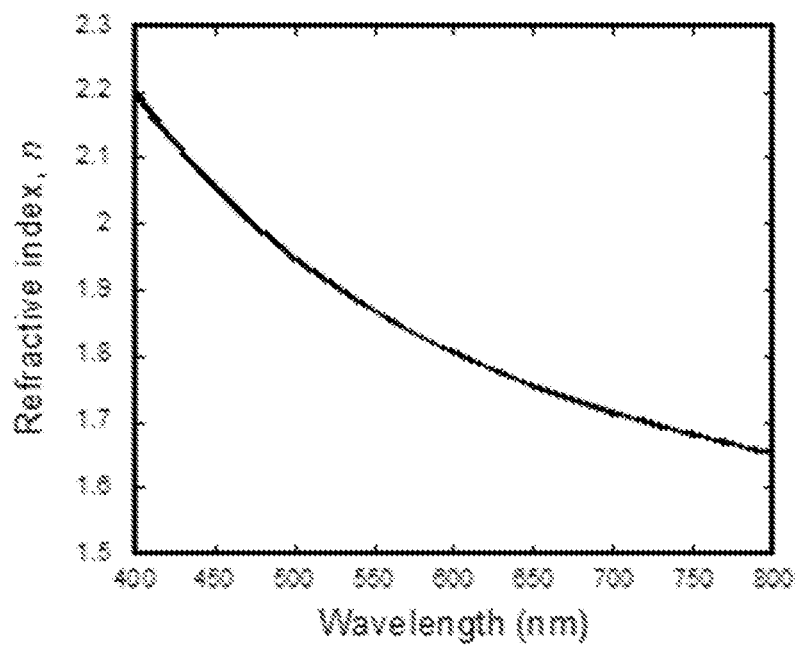
FIG. 4A is a plot of refractive index as a function of wavelength for a polydisulfide polymer in accordance with some implementations.
Figure 4B:
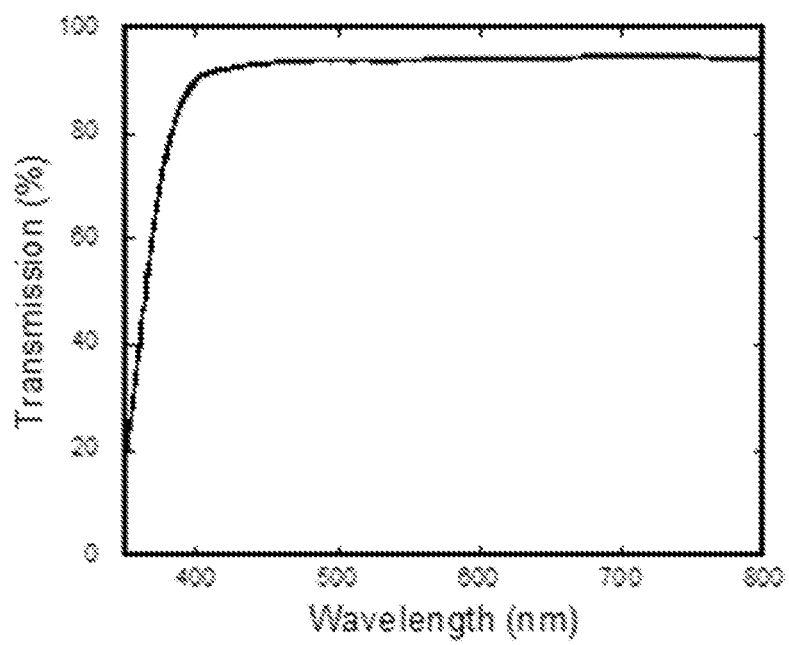
FIG. 4B is a plot of optical transmission through 1 µm of a polydisulfide polymer in accordance with some implementations.

FIG. 4A is a plot of refractive index as a function of wavelength for a polydisulfide polymer in accordance with some implementations. FIG. 4B is a plot of optical transmission through 1 µm of a polydisulfide polymer in accordance with some implementations. It will be appreciated that the refractive index and optical transparency depends on the monomers selected for the synthesis. When different monomers were used for the synthesis, various polydisulfide polymers with a variety of refractive indexes ranging from 1.70 to 1.85 were obtained. The measured transmission for a thin film with a thickness of 1 um was higher than 90% between 400 nm and 800 nm.

What is claimed is:
1. A random polydisulfide copolymer comprising:
one or more thiol monomers; and
one or more ene monomers in a non-stoichiometric ratio randomly cross-linked with the one or more thiol monomers, wherein the non-stoichiometric ratio provides the polydisulfide copolymer with a refractive index greater than approximately 1.7, an optical transparency of at least 0.9 per µm, and solubility in one or more organic solvents such that the polydisulfide copolymer can be applied to form an optical element at least 20 nm thick.

2. The polydisulfide copolymer of claim 1, wherein the one or more thiol monomers include one or more aromatic thiol monomers.

3. The polydisulfide copolymer of claim 2, wherein the one or more aromatic thiol monomers include one or more phenyl-thiol monomers.

4. The polydisulfide copolymer of claim 1, wherein the one or more ene monomers include one or more silane monomers.

5. The polydisulfide copolymer of claim 4, wherein the one or more ene monomers include one or more vinyl monomers.

6. The polydisulfide copolymer of claim 4, wherein the one or more ene monomers include one or more acrylate monomers.

7. The polydisulfide copolymer of claim 6, wherein the one or more acrylate monomers include one or more methacrylate monomers.

8. The polydisulfide copolymer of claim 1, wherein the polydisulfide copolymer is a random polydisulfide copolymer.

9. The polydisulfide copolymer of claim 1, wherein the polydisulfide copolymer includes one or more cross-links.

10. The polydisulfide copolymer of claim 1, wherein the polydisulfide copolymer includes more thiol monomers than ene monomers resulting in the non-stoichiometric ratio.

11. The polydisulfide copolymer of claim 1, wherein the polydisulfide copolymer has a refractive index greater than 1.8.

12. The polydisulfide copolymer of claim 1, wherein the one or more organic solvents include at least one of allicin, (R)-cysteine, methionine, diphenyl disulfide, dibenzothiophene, dimethyl sulfoxide, or dimethyl sulfone, toluene, dimethylformamide, chlorobenzene, dichlorobenzene, hexane, tetrahydrofuran, N-methyl-2-pyrrolidone, 1,3-dimethyl-3,4,5,6-tetrahydro-2(1H)-pyrimidinone, cyclopentanone, cyclohexanone, benzene, chloromethane, dichloromethane, pyridine, propylene glycol methyl ether acetate (PGMEA).

* * * * *